United States Patent [19]

Crouch et al.

[11] 3,998,609
[45] Dec. 21, 1976

[54] SYNTHESIS GAS GENERATION

[75] Inventors: William B. Crouch, Whittier; William L. Slater, La Habra; Warren G. Schlinger, Pasadena, all of Calif.

[73] Assignee: Texaco Inc., New York, N.Y.

[22] Filed: Oct. 1, 1975

[21] Appl. No.: 618,535

[52] U.S. Cl. .............................. 48/197 R; 48/200; 48/202; 48/206; 48/215; 55/17; 55/256; 252/373
[51] Int. Cl.² ...................... C10J 3/16; C10K 1/00
[58] Field of Search ............... 48/197 R, 200, 201, 48/202, 206, 215; 252/373; 55/256, 17, 434

[56] References Cited

UNITED STATES PATENTS

| | | | |
|---|---|---|---|
| 3,544,291 | 12/1970 | Schlinger et al. | 252/373 |
| 3,676,982 | 7/1972 | Price | 55/252 |
| 3,715,195 | 2/1973 | Tassoncy et al. | 48/197 R |

Primary Examiner—Robert L. Lindsay, Jr.
Assistant Examiner—George C. Yeung
Attorney, Agent, or Firm—T. H. Whaley; C. G. Ries; Robert Knox, Jr.

[57] ABSTRACT

Production of a gas suitable for use as a fuel or for conversion into a fuel and simultaneous production of a gas saturated with steam suitable for use as feed to a shift conversion zone.

9 Claims, 1 Drawing Figure

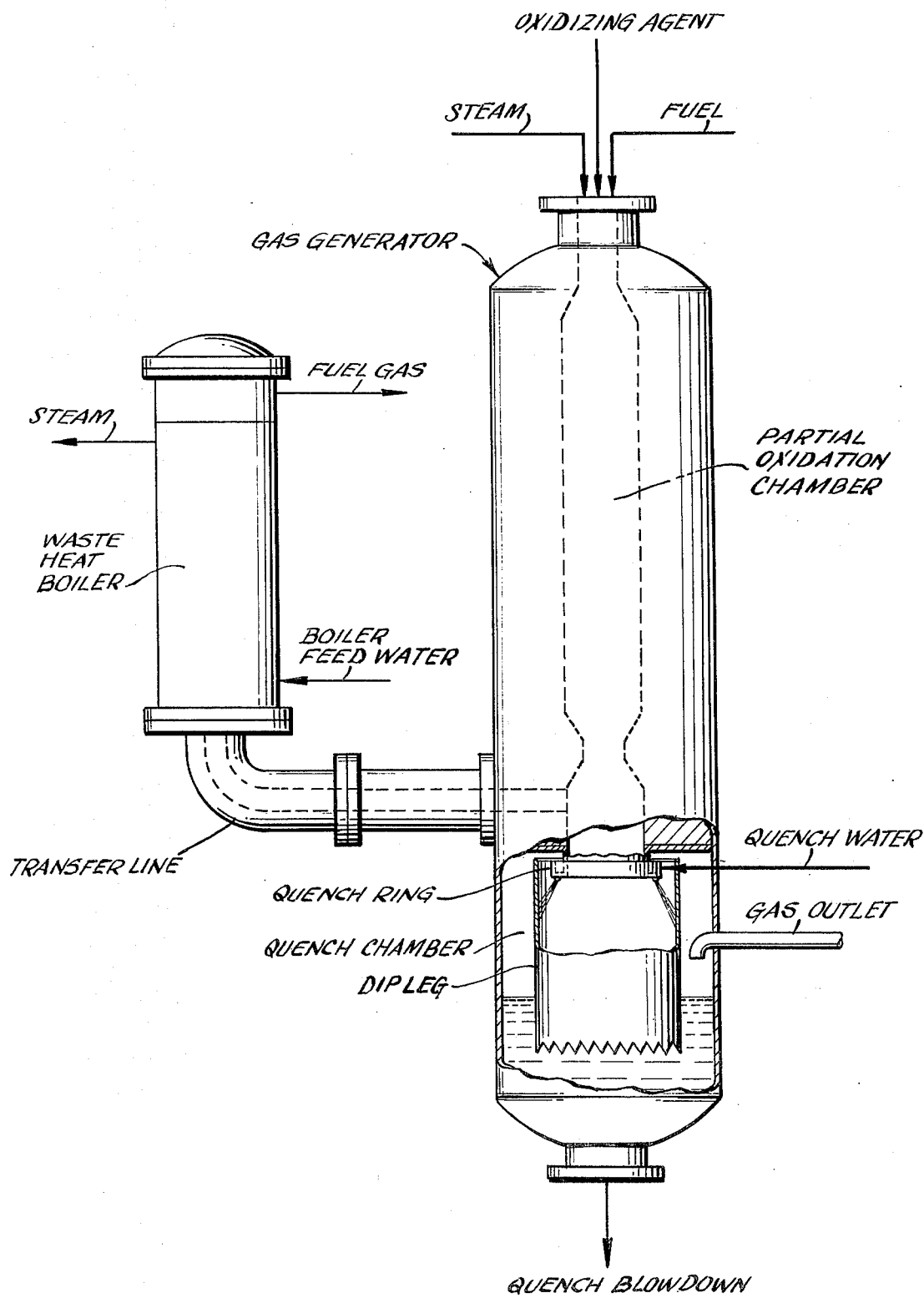

SYNTHESIS GAS GENERATION

This invention relates to the process for the production of synthesis gas from carbonaceous or hydrocarbonaceous fuels by direct partial oxidation with an oxygen-containing gas. In one of its more specific aspects, the present invention relates to a non-catalytic process for generating a gas which is suitable for use as a fuel and simultaneously generating a gas which is suitable for use as feed to a shift conversion zone, particularly when the feed to the gas generation contains ash-forming constituents.

The generation of carbon monoxide and hydrogen, or synthesis gas, by non-catalytic reaction of carbon-containing fuels with oxygen, air, or oxygen-enriched air, in the presence of steam, is known. Partial oxidation of normally liquid hydrocarbons, especially heavy fuel oils, is a highly economical method of producing synthesis gas in quantity. In the partial oxidation process, the liquid or solid fuel is reacted with oxygen and steam in a closed, compact reaction zone in the absence of catalyst or packing at an autogenous temperature within the range of about 1800° to 3200° F., preferably in the range of about 2200° to 2800° F. If the feed is a hydrocarbon oil it may be partly or completely vaporized and mixed with or dispersed in steam. The hydrocarbon oil and steam are usually preheated to a temperature in the range of 300° to 800° F., generally to a temperature of at least 600° F. Oxygen usually is not preheated, but air or oxygen-enriched air may be preheated. If the feed is a solid fuel it is usually introduced into the reaction zone as an oil or water slurry or suspended in oil or water vapor.

The reaction zone is usually maintained at a pressure above about 100 pounds per square inch gauge, e.g. 250 to 3000 psig; recent trends are toward higher operating pressures up to about 2500 to 3000 psig. The product gas stream consists primarily of carbon monoxide and hydrogen and contains smaller amounts of carbon dioxide, steam, methane, and entrained soot and, depending on the feed, small amounts of ash in the form of metal oxides. Soot produced in the process is in very fine particle form which is easily wet by water.

Product gases issuing from the gas generation zone contain a large quantity of heat. The heat may be employed advantageously to convert water to steam either by direct contacting of the hot gas stream with water or by passing the hot gas stream through a suitable heat exchanger, such as a waste heat boiler.

If the synthesis gas is intended for use in the production of hydrogen by shift conversion, advantageously it is contacted directly with water in quench and scrubbing zones to remove particulates which have a detrimental effect on the shift conversion catalyst. Not only does the quench and scrub water remove particulates from the gas but in addition it saturates the gas with steam which is desirable as the presence of $H_2O$ is necessary for the shift reaction to take place. By regulating the temperature and pressure of the scrubbing zone, it is possible to control the amount of water vapor present in the gas being fed to the shift conversion zone.

If the product gas is to be used for methanol synthesis or as a fuel gas there is little advantage to be gained by quenching the hot combustion products with water and it is usually more desirable to recover sensible heat from all or a portion of the gas by indirect heat exchange such as by passing the hot gas through a waste heat boiler. However, because of the presence of soot and ash particles in the raw synthesis gas it should not be introduced directly into the waste heat boiler as the particles settle on the heat exchange surfaces reducing the efficiency of the waste heat boiler. For this reason, design specifications for waste heat boilers usually call for a maximum particulate or soot content in the gas not greater than 7.5 g/$NM^3$. In addition, if the fossil fuel fed to the synthesis gas generator contains ash-forming constituents such as a petroleum residuum or a solid fuel, the ash particles in the product gas should be removed before it is passed through the waste heat boiler. However, if as mentioned above, the addition of steam to the product synthesis gas is undesirable, as in the case where the gas is to be used as a fuel, the gas cleanup presents a problem.

It is an object of the present invention to produce a synthesis gas substantially free from solid contaminants while avoiding liquid scrubbing and quenching. Another object is to produce clean synthesis gas suitable for passing through a heat exchanger. Another object is to reduce the solid content of synthesis gas in the absence of liquid scrubbing and to produce simultaneously synthesis gas containing added steam suitable for use as feed to a shift conversion zone. These and other objects will be apparent to those skilled in the art from the following disclosure.

According to our invention there is provided a process for the production of synthesis gas of reduced solid content which comprises subjecting a carbonaceous fuel to partial oxidation to produce a synthesis gas stream containing entrained solid particles comprising soot and ash, passing said gas stream through a confined zone thereby accelerating the rate of flow of said gas stream and increasing the velocity of said solid particles and diverting a stream of gas of reduced solid content from said particles of increased velocity.

Synthesis gas, which is composed primarily of carbon monoxide and hydrogen and as produced also contains steam, methane, carbon dioxide, entrained soot particles and, depending on the feed, small amounts of ash, is ordinarily prepared by subjecting a carbonaceous fuel such as a fossil fuel to partial oxidation. The oxidizing agent may be substantially pure oxygen, air, or oxygen-enriched air, the particular agent selected being determined by the end use of the gas.

The feed to the gas generation zone comprises a carbonaceous fuel which may be either liquid or solid. Examples of liquid fuels are crude petroleum oils, tar sand oil, shale oil and the like, virgin distillates recovered therefrom such as gas oils, still residua such as atmospheric residua and vacuum residua and refinery streams such as cycle gas oils and the like. Examples of solid fuels are anthracite and bituminous coals, lignites, and their derivatives such as coke. Tar, asphalt, and organic waste may also be used as fuel to the gas generation zone. The fuels may be introduced into the gas generation zone as liquid, vaporized liquid, finely divided solid suspended in liquid or vapor, or as a solid-liquid slurry.

The amount of oxidizing agent used will vary and depends on the amount of carbon which it is desired to produce. Ordinarily, the generator is operated to convert about 98% of the carbon in the feed to oxides of carbon with the balance of the carbon appearing in finely-divided soot particles in the synthesis gas. However, if the feed contains ash-forming constitutents, it may be desirable to operate the generator so that as much as 20% of the carbon in the feed is not converted. The unconverted carbon sequesters the incandescent ash particles thereby protecting the refractory lining of the generator.

As the gas stream leaves the partial oxidation chamber, it passes through a constriction at the exit thereof which results in acceleration of the gas stream to a rate of at least 1.0 ft./sec. and preferably between 5.0 and 50.0 ft./sec. Beyond the constriction is a side opening leading to a transfer line through which gas, because of its low density, may be withdrawn whereas the solid particles of relatively high density continue on their path, are wetted by quench water, and settle to the bottom of a quench chamber. The withdrawn gas stream because of its low solids content is now suitable for contact with heat exchange surfaces. If desired, only a portion of the gas may be withdrawn and sent through the heat exchanger, and the balance of the gas may be subjected to water scrubbing and then introduced into a shift conversion zone for the production of hydrogen.

For a better understanding of the invention, reference is now made to the accompanying drawing which is submitted for illustrative purposes only and which shows diagramatically in a simplified manner how one embodiment of the invention may be practiced. Referring now to the drawing, oxidizing agent, fuel, and steam are introduced into the gas generator and reacted in the partial oxidation chamber. The resulting gas stream containing entrained particles is then passed through a constricted zone as it leaves the reaction zone whereby the rate of the gas is accelerated and concomitantly the velocity of the particles entrained in the gas stream is increased. As the gases pass toward the quench chamber a portion of the gas is withdrawn through a transfer line by means of which it is introduced into the tubes of a waste heat boiler. Water introduced into the waste heat boiler is converted to steam and cooled gas suitable for use as a fuel is withdrawn from the waste heat boiler. The remaining portion of the synthesis gas enters the quench chamber where it passes through a dip leg and is discharged into the quench water which has been introduced into the chamber through a quench ring. The solid particles are wetted by the water and descend to the bottom of the quench chamber. Gas substantially free from solid particles is withdrawn from the quench chamber through the gas outlet. Water containing soot and ash is removed from the quench chamber as required through the quench blowdown.

The following example is submitted for illustrative purposes only and it should not be construed that the invention is restricted thereto. Petroleum coke having the following analysis:

Table 1

| Component | Weight % |
| --- | --- |
| C | 81.77 |
| H | 7.98 |
| N | 1.47 |
| S | 1.78 |
| O (by difference) | 4.26 |
| Ash | 2.74 | was formed into a 46 wt. % slurry in California Reduced Crude and after ball-milling and preheating to a temperature of 213° F. was introduced into an unpacked gas generator having a volume of 14.95 cu. ft. Steam and oxygen of 99.7% purity both heated to a temperature of 348° F. were also introduced into the gas generator which was maintained at a pressure of 358 psig. Operating data appear below in Table 2.

Table 2

| Period | $H_2O/F$ | O/C | SOC | Temp. ° F. | % C |
| --- | --- | --- | --- | --- | --- |
| 1 | .31 | .860 | 290.5 | 2598 | 8.2 |
| 2 | .31 | .871 | 301 | 2612 | 9.7 |
| 3 | .31 | .874 | 300 | 2685 | 8.6 |
| 4 | .45 | .905 | 288 | 2453 | 2.0 |

In the headings of the various columns $H_2O/F$ indicates water to fuel weight ratio, O/C indicates oxygen to carbon atomic ratio, SOC represents specific oxygen consumption, that is, cu. ft. of oxygen per 1000 cu. ft. of hydrogen plus carbon monoxide and % C is the amount of carbon in the feed appearing as soot or carbon in the synthesis gas.

The effluent gas, by being passed through a constricted exit opening having a diameter approximately one third that of the partial oxidation chamber is accelerated to a velocity of 35 ft. per second and a sidestream is withdrawn in the manner shown in the accompanying drawing. Data on the percentage of gas going to the waste heat boiler through the side-stream, the amount of carbon in the gas side-stream and the percent carbon in the balance of the gas stream which is directed to a conventional quench are reported below in Table 3.

Table 3

| Period | % Gas in Side-stream | Carbon in side-stream gms/NM$^3$ | Carbon in Gas to Water Quench % of Total |
| --- | --- | --- | --- |
| 1 | 57.5 | 1.2 | 97.8 |
| 2 | 75.8 | 1.6 | 96.9 |
| 3 | 69.9 | 0.5 | 98.9 |
| 4 | 73.1 | 1.0 | 89.9 |

Analysis of the solid material recovered from the quench blowdown shows it to contain 81.23 wt. % carbon, 2.02 wt. % sulfur and 15.5 wt. % ash.

Various modifications of the invention as hereinbefore set forth may be made without departing from the spirit and scope thereof, and therefore, only such limitations should be made as are indicated in the appended claims.

We claim:

1. A process for the production of synthesis gas of reduced particulate content in the absence of liquid scrubbing which comprises subjecting a carbonaceous fuel to partial oxidation to produce a synthesis gas stream containing entrained solid particles comprising soot and ash, passing said gas stream through a confined zone thereby accelerating the rate of flow of said gas stream to a velocity of at least five feet per second whereby the velocity of said solid particles is also increased and withdrawing as a sidestream at least a portion of said accelerated gas stream, said portion having a reduced solids content while the accelerated particles continue on their path.

2. The process of claim 1 in which the carbonaceous fuel is a particulate solid fuel introduced into the partial oxidation zone as a water slurry.

3. The process of claim 1 in which the carbonaceous fuel comprises a petroleum residuum.

4. The process of claim 1 in which the carbonaceous fuel comprises a solid fuel.

5. The process of claim 1 in which the carbonaceous fuel is a mixture of liquid and solid fuels.

6. The process of claim 1 in which said withdrawn stream is cooled by indirect heat exchange.

7. The process of claim 1 in which said withdrawn portion of the synthesis gas stream is cooled by indirect heat exchange and the balance of the synthesis gas stream is cooled by direct heat exchange.

8. The process of claim 1 in which the velocity of the gas stream is accelerated to a rate between 5 and 50 ft./second.

9. The process of claim 1 in which the particulate content of said withdrawn portion is not greater than 7.5 grams per normal cubic meter.

* * * * *